Sept. 17, 1935.  E. FISCHEL  2,014,965
REGULATING DEVICE
Filed Jan. 31, 1934  2 Sheets-Sheet 1
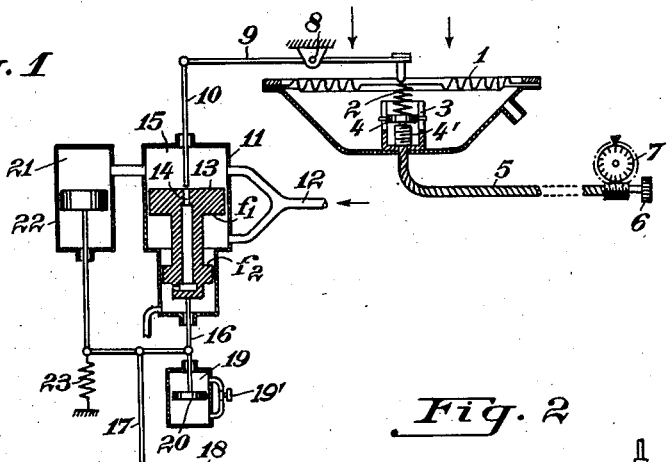
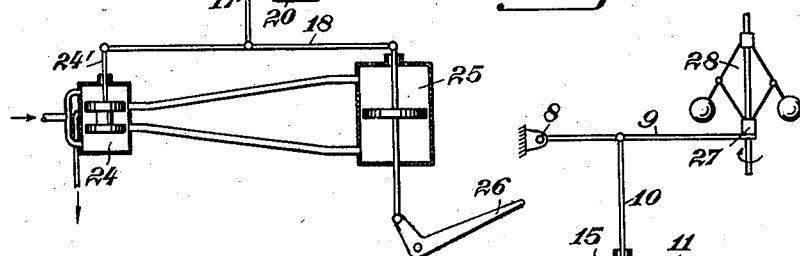
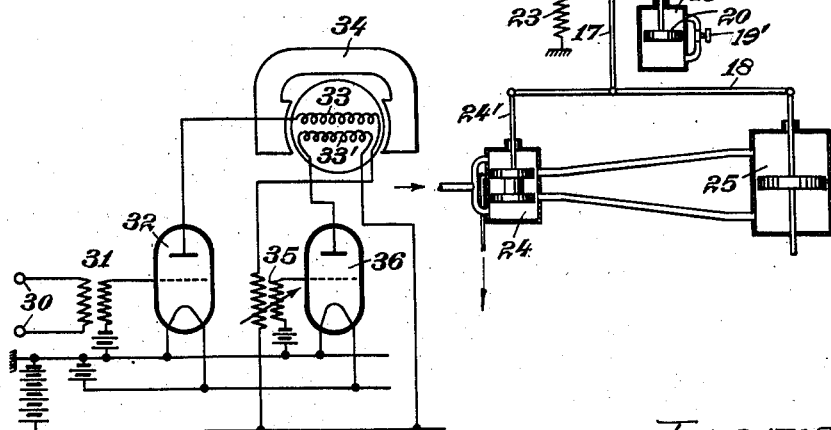
INVENTOR
EDUARD FISCHEL
By *Fika Schlenker*
ATTORNEYS.

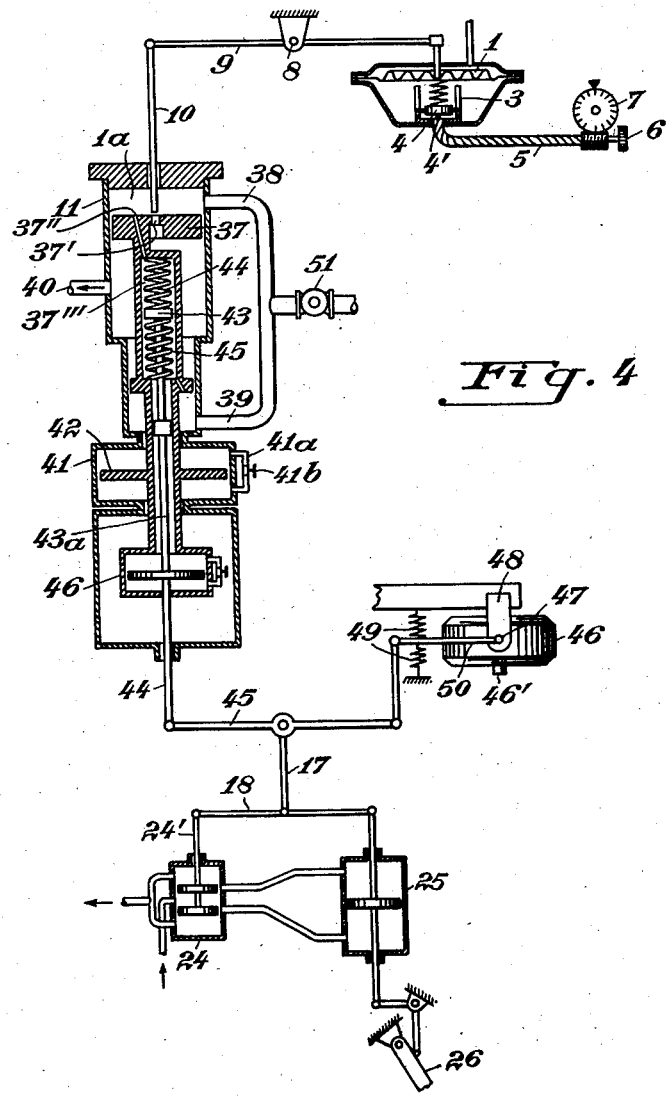

Patented Sept. 17, 1935

2,014,965

UNITED STATES PATENT OFFICE 2,014,965

REGULATING DEVICE

Eduard Fischel, Berlin-Charlottenburg, Germany, assignor to Siemens-Apparate und Maschinen G. m. b. H., Berlin, Germany, a corporation of Germany Application January 31, 1934, Serial No. 709,197
In Germany February 3, 1933

4 Claims. (Cl. 244—29)

The invention relates to a regulating-device.

In regulating systems it may be effected by retrieving the regulating device by the adjustable regulating member, that the oscillations about the desired value are continuously decreasing. In these devices the damping of the oscillations will be the better, the more the whole regulating system is unbalanced. Therefore it is necessary, to forego to a closely aperiodic reaching of the desired value, if this value is to be maintained constant with high accuracy. It is known to use beyond the rate of deviation from the desired value also other controlling values, according to which the regulating member will be adjusted with the effect of stronger damping of the oscillations. More particularly it has been proposed to determine not only the deviations from the desired value but also the rate of change of these deviations and to use these two values for controlling the regulating member of the regulating system. For example in connection with automatic directional steering devices for ships or aircrafts it is known to use beyond a measuring device for the angle of directional deflection also a device, for example a turn indicator, for measuring the velocity of angular movement of the aircraft and to influence the rudder-mechanism according to the deflections of these two measuring devices. In this case the rate of change of the desired value will be determined by a separate instrument. Not in all cases is it possible or desirable to adopt this way of determining the rate of change, but it is better and more simple in construction to derive the rate of change from the measured changes of the desired value.

According to this invention the rate of change of the desired value to be maintained, and, as the case may, also further derivatives of the said desired value are obtained by means of one or more differentiating devices which are directly influenced by the normally measured value. This value to be measured and to be maintained on a constant rate by means of the regulating device, may be of any kind, for example, an angle-value, a velocity, an electric current or voltage, a temperature or the like.

The invention will be better understood from several embodiments, diagrammatically shown in the drawings in which Fig. 1 represents an automatic steering device for aircrafts influenced by an instrument measuring the relative velocity of aircraft, Fig. 2 represents the automatic regulating of the velocity of a machine;

Fig. 3 represents a somewhat altered part of Figs. 1 and 2 for electrically differentiating the controlling value, Fig. 4 shows another embodiment for regulating the stability of aircrafts.

In Fig. 1 the diaphragm 1 of a differential manometer is influenced on the one side by a pressure proportional to the velocity of the aircraft relatively to the air, which pressure may be obtained by a Venturi-nozzle or the like. On its other side the diaphragm 1 is urged by a spring 2 according to the velocity to be maintained by the aircraft. This spring 2 is connected with its one end to the diaphragm 1 and with its other end to a nut 4, provided with pins sliding in guiding slots of a member 3. The spindle 4' of the nut can be rotated by means of the flexible shaft 5 with hand wheel 6. By turning this hand wheel the tension of the spring 5 may be adjusted on a rate according to the desired wind-velocity of the aircraft. This velocity is indicated by the scale 7 coupled by a worm gear with the flexible shaft 5.

The deflections of the diaphragm 1, proportional to the deviations of the aircraft-velocity from the desired velocity, are transmitted to the control-needle 10 by a two-armed lever 9, fulcrumed at 8. Within the valve-housing or cylinder 11 a piston 13 is slidable under the influence of a pressure medium, for instance, oil, entering through the pipe 12. If the needle 10 is moved back relatively to the piston 13, the duct 14 of the piston is opened in consequence of which the pressure in the chamber 15 will drop. As the area of the surface $f_1$ is larger than that of the surface $f_2$, the piston will follow the needle 10 until this needle throttles the duct 14 to such an extent that the two said pressures are equal. The movement of the piston 13 is transmitted by means of the rod 16 to rods 17 and to the control valve 24. In this way the movements of the valve 24 are proportional to the deflections of the diaphragm 1. The rod 16 is connected with an oil-cataract or motor 19, the damping intensity of which is adjustable by a throttle-valve or by-pass valve 19'. The damping intensity of such a cataract is, as well known, proportional to the velocity of the piston 20. Also the changes of pressure in the chamber 15 are proportional to the said damping intensity as is also the pressure in the chamber 21 of the small cylinder 22. The piston of this cylinder 22 moving against the action of a spring 23, the velocity of this piston is exactly proportional to the rate of change of the deflections of the diaphragm 1.

The movement of the said piston is also transmitted to linkage 17, 18, 24' and to the control valve 24. Therefore the control valve is shifted according to the wind velocity of the air craft as well as according to the rate of change of this velocity, that is the acceleration of the aircraft. The piston of the hydraulic motor 25, adjusting the steering rudder 26 of the aircraft, follows the movement of the piston of the control valve 24, thus retrieving the piston of this valve 24 by means of the two armed lever 18.

In order to increase the accuracy of regulation a second device with a control needle may be provided in a known manner, which needle may be actuated by the lever 10 and will itself control a device similar to the elements 13, 14, 15, the piston of this device actuating the piston 10 of the arrangement shown.

In Fig. 2 part of a hydraulic regulating device for a power-machine is represented, in which the lever 9, again actuating the needle 10, is coupled with the slide 27 of a centrifugal governor 28 of a known type. The elements 10—25 are arranged and constructed in the same manner as shown in Fig. 1. In this case the motor 19 adjusts the regulating member of the power machine in accordance with the amount of deviation and of the rate of change of the rotary speed of the machine from that speed, which is to be maintained constant.

In the arrangements described above the oil-cataract or motor 19, 20 may be replaced by any other damping-device, the damping intensity of which is proportional to the speed of its movement. For instance the damping may be obtained by means of an adjustable throttle valve, arranged in one branch of the pipe 12.

Instead of the oil any other pressure-medium, for instance air, may be used. The invention may be embodied in any other suitable form, an electrical one being shown in Fig. 3.

It is assumed that the voltage or the current at the terminals 30 is to be maintained constant. This voltage is supplied to the primary of a transformer 31, the secondary of which is connected to the grid-circuit of an electronic tube 32. The output of this tube is supplied to the one winding 33 of a galvanometer 33, 33' and to the primary of a transformer 35. The secondary of this transformer 35 is connected to the grid-circuit of a second electronic tube 36, the output of which is supplied to the other winding 33' of the galvanometer 33, 33'. The two windings 33 and 33' are mechanically connected with each other and form the rotatable element of the galvanometer. As the current in the winding 33 is proportional to the voltage at the points 30 while the current in the second winding 33' is proportional to the rate of change of said voltage, the galvanometer will be deflected according to the sum of the amount of change of the initial tension and of the rate of change of this initial tension. The deflection of the galvanometer therefore may be used for regulating the driving machine of the generator supplying the voltage to the terminals 30.

As one modification of the described invention, further differentiating devices may be added to obtain further derivatives of the originally measured value, as the case may be.

In the arrangement according to Fig. 1 the control value, received from the differentiating device serves for damping the regulating oscillations. In case the regulating system so far described is to be used in connection with aircrafts the damping of the aircraft-oscillations must be very accurate. For example in the arrangement described for stabilizing the speed of aircraft there may arise two kinds of oscillations, namely deviations from the desired relative speed of the aircraft, having a long oscillation period, and pendulous movements about the transverse axis of the aircraft, having a relatively short oscillation period. The device shown in Fig. 1, enables the damping of only the first named oscillations of long oscillation period; for damping the second kind of oscillations the device so far described will not be available, as the turning velocity of these oscillations will not or not sufficiently be determined by the differentiating device.

In order to compensate the second kind of oscillations more exactly, according to a further feature of the invention the angular velocity of the aircraft is measured and used as a control value additional to the aforesaid two values, that is the originally measured steering value and its first derivative, obtained from the said differentiating device. The angular velocity of the aircraft about its transverse, longitudinal or vertical axis may be measured by a turn indicator of well known character which is sensitive even to very small angular movements of the aircraft and will influence the regulating in such a way that the above mentioned oscillations of short periods are eliminated when arising.

If not the stabilizing of the aircraft speed but of the position of the aircraft is to be obtained, the main control instrument may be a pendulum measuring the fore- and aft-inclinations of the aircraft, for instance a gyroscopic pendulum or the like, which instruments again actuate the differentiating device.

The longitudinal stabilization of the aircraft may also be influenced by means for indicating the angle of incidence of the wind relatively to the wings of the airplane. The device for measuring this angle in a known manner may consist of a cylindrical aerofoil, the symmetry plane of which is parallel with the longitudinal and the transverse axes of the aircraft. This aerofoil is arranged in the flying wind in such a manner that the pressures in the two jets, symmetrically arranged with respect to the leading edge of said aerofoil, are equal as long as the said symmetry plane is horizontal. However as soon as the aircraft slips upwards or downwards, the air-pressures in the jets will become different so that a differential manometer connected by means of pipes to said jets, will be deflected according to the velocity of slip, this velocity depending on the change of the angle of incidence. By this differential manometer a differentiating device of the mentioned type will be influenced so as to determine the rate of change of the angle of incidence.

Besides the angle of incidence and its rate of change the angular velocity of aircraft about its transverse axis may be measured by a turn indicator for influencing the rudder mechanism for longitudinal stabilization.

The cooperating of the three aforesaid control values will be better understood from a device for longitudinal stabilization as shown in Fig. 4. The elements 1—10 are the same as shown in Fig. 1 and described above. In the cylinder 11 the piston 37 is movable. Above and below the differential piston 37 oil or any other pressure medium is fed by means of the pipes 38, 39. The pipe 40 forms the outlet of the pressure oil. A throttle valve 51, arranged in the common feeding pipe, serves for regulating the pressure of the oil. The piston 37 will follow the longitudinal movements of the needle 10. As already described with relation to Fig. 1, the function is as follows:

If the needle 10 is moving back, the throttling of the channel 37' effected by the needle will be decreasing and in consequence of this the pressure in the chamber 1a will also become less. Therefore the piston 37 will follow the needle until the needle 10 throttles the channel 37' to such an extent that the pressures acting upon the piston 37 will be balanced. The movement of the piston 37 is damped by means of the damping device 41, 42, the piston 42 of which is connected to the piston 37. The chambers above and below the piston 42 are connected with each other by the pipe 41a, in which the adjustable throttle valve 41b is arranged. The damping cylinder may be filled with air, oil or the like. The damping exerted by such a damping device is in a known manner proportional to the speed of the piston 42 and, as this piston is connected to the piston 37, also to the speed of the piston 37.

Within the differential piston 37 the piston 43 is arranged. The springs 44 and 45 tend to maintain the piston 43 in its shown middle-position. The piston-rod 43a extends through the piston 37 and is coupled with the rod 44, by means of which the longitudinal movement of the piston 37 is transmitted to the two armed lever 45. As mentioned above the damping force of the damping device 41, 42 is proportional to the speed of the differential piston 37. Also the pressure in the chamber 1a is proportional to the speed of the piston 37. This pressure is communicated by means of the channel 37'' to the chamber 37''' above the piston 43, in consequence of which the piston 43 will move according to the difference of pressures, acting upon this piston through the pipes 37'' and 37'''. As this movement takes place against the action of the one or the other of the two springs 44 and 45, the amount of movement of piston 43 is proportional to the moving speed of the piston 37. However, as this piston is moving according to the deviations of the aircraft-speed from the desired speed, the movement of the piston 43 will be proportional to the sum of the said deviations and of the first derivative of said deviations, which derivative is obtained by means of the piston 43 and corresponds to the acceleration of the aircraft-movement.

The piston rod 43a may be coupled with a damping device 46, constructed like the damping device 41—42 and compensating or eliminating sudden movements of the needle 10 with respect to the pistons 37 and 43.

In contradistinction to the embodiment shown in Fig. 1 the differential lever 45 is influenced not only according to the sum of the measured value of aircraft speed and of the first derivative of this value but also according to the angular velocity of the aircraft about its transverse axis. This angular velocity is measured by a so-called turn indicator of the well-known gyroscopic type. In the construction illustrated this turn indicator comprises the gyroscope 46, the rotation axis 46' of which is in this case arranged parallel to the longitudinal axis 47 of the aircraft and the precession axle has its horizontal bearings in the part 48. The precession of the gyroscope 46 is constrained by the springs 49, for which reason the deflection of the precession axle 47 is proportional to the angular velocity of the aircraft about its transverse axis. The said deflections are transmitted to the right end of the lever 45 by means of the lever 50.

The algebraic sum of all three control values, that is the deviations from the desired speed of aircraft, the acceleration of aircraft and the angular velocity about the transverse axis of the aircraft, is transmitted by means of the rod 17 and the two-armed lever 18 to the piston rod 24' of the valve 24 controlling the motor 25 of the altitude rudder 26. The piston of the motor 25 will follow the movement of the rod 17 exactly, as the control valve is retrieved by the motor by means of the differential lever 18.

Obviously the oscillations of the aircraft-speed about the desired value set at the diaphragm 1 are compensated exclusively by the regulating device acting upon the left end of the lever 45, the acceleration of aircraft, obtained by this device, serving for damping these oscillations of relatively long period. The angular oscillations of the aircraft about its transverse axis are at once measured by the gyroscopic turn indicator 46 and damped by the action of this turn indicator upon the rudder motor.

In an arrangement according to the invention for the transverse stabilization of aircrafts the turn indicator must be arranged in such a way, that its rotation axis is parallel to the vertical axis of the aircraft and its precession axis is parallel to the transverse axis of the aircraft. The instrument measuring the longitudinal speed of aircraft would be in this case replaceable by an instrument measuring the side slip of the aircraft, for instance a transverse pendulum or the like. The last mentioned instruments enable only a retarded measurement of the transverse inclinations of the aircraft, as on the arising of such inclinations a side slip will occur only gradually and as a pendulum often will deviate from the true vertical, if transverse or centrifugal accelerations are acting upon it. The influence of the control device acting upon the left end of the two-armed lever 45 would again be retarded, whilst in this case also the turn indicator would measure even the smallest angular velocity and therefore influence the rudder motor in the direction of preventing the said angular movements of aircraft.

I claim:

1. A regulating system for stabilizing aircrafts comprising means for measuring the deviations of aircraft from the value to be maintained constant, a differentiating device for differentiating the value measured by the beforesaid means, this differentiating device consisting of a differential piston moving in a cylinder, a control needle, a two-part damping device, the one part of which is in operative connection with said differential piston, a second piston, a second cylinder, a communicating pipe between said two cylinders and a spring connected to said second piston, and means for bringing about a combined action by the measured value and its derivative upon the element to be adjusted in order to maintain the aircraft stabilized.

2. A regulating system for stabilizing aircraft comprising means for measuring the deviations of aircraft from the value to be maintained constant, a differentiating device for differentiating the value measured by the beforesaid means, this differentiating device consisting of a differential piston, a cylinder for said piston, a control needle moved according to said measured value, within said piston, a two-part damping device, one part of which is connected to said differential piston, a second piston, the cylinder of which is formed by said differential piston, a second damping device with a piston and a cylinder, the last mentioned piston connected to the piston moving within said differential piston, the cylinder of the last mentioned damping device being connected to the differential piston, a spring arrangement acting upon said piston moving within said differential piston, and means for bringing about a combined action by the measured value and its derivative upon the element to be adjusted in order to maintain the aircraft stabilized.

3. In a regulating system for stabilizing aircraft, the combination of means for measuring the deviations of the craft from the value to be maintained, two communicating cylinders connected with a supply of fluid under pressure, independently movable pistons, one in each of said cylinders, one of said pistons having a passage connecting the cylinder chambers at opposite ends of such piston, a movable element controlling said passage, an operative connection from said measuring means to said movable element, damping means connected with such piston, movable mechanism having operative connections to both of said pistons to take a position responsive to the joint action of said pistons, and regulating means operated by said mechanism.

4. In a regulating system for stabilizing aircraft, the combination of means for measuring the deviations of the craft from the value to be maintained, two communicating cylinders one of which has both of its ends connected with a supply of fluid under pressure, independently movable pistons, one in each of said cylinders, the piston which is located in the cylinder connected with the supply of fluid having a passage connecting the cylinder chambers at opposite ends of such piston, a movable element controlling said passage, an operative connection from said measuring means to said movable element, damping means connected with such piston, movable mechanism having operative connections to both of said pistons to take a position responsive to the joint action of said pistons, and regulating means operated by said mechanism.

EDUARD FISCHEL.